US005722069A

United States Patent [19]
Donner

[11] Patent Number: 5,722,069
[45] Date of Patent: *Feb. 24, 1998

[54] ENTERTAINMENT SYSTEM FOR PLAYING COMMUNICATION MEDIA FOR AN AUTOMOBILE

[75] Inventor: Irah H. Donner, Silver Spring, Md.

[73] Assignee: Donner, Inc., Silver Spring, Md.

[ * ] Notice: The term of this patent shall not extend beyond the expiration date of Pat. No. 5,420,931.

[21] Appl. No.: 451,339

[22] Filed: May 26, 1995

Related U.S. Application Data

[63] Continuation-in-part of Ser. No. 104,446, Aug. 10, 1993, Pat. No. 5,420,931.

[51] Int. Cl.[6] .............................. H04Q 7/20; H04Q 7/32

[52] U.S. Cl. .......................... 455/418; 455/422; 455/425; 455/517; 455/566; 381/86

[58] Field of Search ....................... 379/58, 59, 217–221, 379/67, 88, 93, 207; 455/89, 418, 422, 517, 425, 558, 566, 575, 33.1, 33.2; 348/12, 13, 14, 18, 19

[56] References Cited

U.S. PATENT DOCUMENTS

| | | | |
|---|---|---|---|
| 5,056,153 | 10/1991 | Taniguchi et al. | 455/89 |
| 5,243,640 | 9/1993 | Hadley et al. | 379/59 |
| 5,420,931 | 5/1995 | Donner | 381/86 |
| 5,469,496 | 11/1995 | Emery | 379/58 |
| 5,594,779 | 1/1997 | Goodman | 379/58 |

*Primary Examiner*—Curtis Kuntz
*Assistant Examiner*—Binh K. Tieu
*Attorney, Agent, or Firm*—Irah H. Donner

[57] ABSTRACT

A system for a vehicle having first and second broadcast devices includes an entertainment system for playing a first medium for first entertainment by outputting a first signal, and a mobile telephone receiving and playing a second medium by outputting a second signal. The system also includes a controller monitoring the first and second signals output from the entertainment system and the mobile telephone respectively, and outputting a control signal to control switching between the entertainment system and the mobile telephone and the first and second broadcast devices responsive to the first and second signals. A switch connects the entertainment system and the mobile telephone responsive to the control signal received from the controller. When the controller detects the first and second signals output from the entertainment system and the mobile telephone, the controller controls connections between the entertainment system and the mobile telephone.

20 Claims, 9 Drawing Sheets

ENTERTAINMENT SYSTEM FOR PLAYING COMMUNICATION MEDIA FOR AN AUTOMOBILE

RELATED APPLICATIONS

This is a continuation-in-part of patent application Ser. No. 08/104,446 filed on Aug. 10, 1993, now U.S. Pat. No. 5,420,931.

BACKGROUND OF THE INVENTION

1. Field of the Invention

The present invention relates to the field of entertainment systems such as audio and video systems for automobiles, and in particular, to the field of audio and video systems where, for example, two audio or two video systems are installed in an automobile.

2. Description of the Related Art

Presently, entertainment systems in automobiles, such as audio or video systems, are usually restricted to a single type of system in an automobile, for example, a single cassette player, a single compact disk (CD) player, etc. which typically share the identical speaker system for outputting sounds such as music. In instances where separate speaker systems are provided for the different types of entertainment systems in the automobile, the entertainment system including the separate speaker system is typically an "add on" system. One example of an "add on" system may be a television containing its own speakers which when plugged into a cigarette lighter may be used in the automobile.

However, presently, the current entertainment systems in the automobile are not designed to accommodate the playing requirements of the various listeners in the automobile. Specifically, one of the situations which the present entertainment systems in automobiles are unable to manage is the situation where a first set of listeners are accustomed to viewing or listening to a high quality entertainment medium using a high quality entertainment system, while the second group of listeners are accustomed to viewing or listening to a low quality entertainment medium on either high or low quality entertainment system. These second group of people represent the unsophisticated user having "untrained" ears. The term "entertainment medium" or "medium" are defined to mean any type of magnetic tape for video/audio play, any type of compact disc for video/audio play or any other type of communication medium which is frequently used for entertainment systems in automobiles.

Typically, the present automobiles will offer only a high quality entertainment system and force the second group of users to view or listen to the low quality entertainment medium using the high quality entertainment system. This creates a problem in that the high quality entertainment system may be damaged due to the low quality medium played on the high quality system. In addition, the low quality medium is typically characterized by constant non-stop playing which increases the low quality of the medium.

To put the above situation in concrete terms by way of an example, it is not desirable to have to play children's music which is typically recorded on a low quality tape and played over and over again on a high quality tape system for which an adult may wish to hear high quality music such as an opera, symphony or rock and roll. The poor quality children's tape soils the high quality tape and may ruin it. If the high quality cassette is ruined, it will cost much money to repair or replace. In contrast, if the children's cassette is played on a low quality cassette, it will likely be less expensive to simply replace the low quality cassette than to attempt to repair it. Thus, the consumer enjoys great savings, and what is even sweeter is that the children will never know the difference due to their untrained ears.

Thus, it has been discovered that it is desirable that an entertainment system be provided in an automobile which permits high quality medium to be played on a high quality entertainment system while also permitting low quality medium to be played on a low quality entertainment system. The high quality system may be a system as provided by an automobile manufacturer such as a Nissan factory installed cassette system or a stereo cassette system such as that manufactured by Sherwood™ Model CRD-230 having a retail price of approximately $300. In fact, typical high quality entertainment systems will cost a consumer, for example, anywhere from $100–$150 and up, i.e, systems whose repair price is likely to be less expensive than its replacement cost. In contrast, low quality systems may be purchased from stores such as Radio Shack™ or Kmart™ which may cost the consumer only $30. For example, Ames Department Stores sell Roadmaster cassette systems and accessories from $16 to 60$. These low quality systems are typically less expensive to replace than to repair due to today's inflated costs of labor.

Thus, it has been discovered that it is desirable to avoid the necessity of paying the high cost of labor for repairing entertainment systems when the user does not require a high quality system and when it is possible to replace the system for less money.

In addition, it has been discovered that it is desirable to minimize the cost of owning the high and low quality entertainment systems in the automobile by having the systems share the same speaker system, either in part or in its entirety.

It is also desirable that, in certain situations, it has been discovered that the high and low quality entertainment systems play in separate predesignated locations in the automobile where the output of the high and low quality entertainment systems is expected.

In addition, it has been discovered that it is also desirable that, in certain situations, that the high and low quality entertainment systems play in separate predesignated locations in the automobile simultaneously where the output of the high and low quality entertainment systems is expected.

Further, it has been discovered that it is desirable that in certain circumstances the high and low quality entertainment systems play the same medium to the different occupants in the automobile.

It has also been discovered that it would be beneficial to provide the ability to switch between various entertainment or communication systems in the automobile, particularly in view of the growing number of automobile accessories.

It has also been discovered that it would be advantageous to utilize the broadcast system in the automobile for several of the different entertainment and communication systems in the automobile to maximize the quality of the communication received from external sources in the automobile.

It has also been discovered that it would be advantageous to utilize the broadcast system in the automobile for several of the different entertainment and communication systems in the automobile including the ability to receive audio and video signals on-demand from a video provider, and to selectively transmit the received communication to various broadcast and viewing devices in the automobile.

SUMMARY OF THE INVENTION

It is an object of the present invention to provide a system in an automobile which permits high quality medium to be played on a high quality entertainment system while also permitting low quality medium to be played on a low quality entertainment system.

It is another object of the present invention to avoid the necessity of paying the high cost of labor for repairing entertainment systems when the user does not require a high quality system and when it is possible to replace the system for less money.

It is another object of the present invention to provide an entertainment system having high and low quality entertainment systems which minimize the amount of speakers installed in the automobile.

Another object of the present invention is, in certain situations, to arrange that the high and low quality entertainment systems play in separate predesignated locations in the automobile, separately or simultaneously, where the output of the high and low quality entertainment systems is expected.

It is another object of the present invention that in certain circumstances the high and low quality entertainment systems play the same medium to the different occupants in the automobile.

Further, it is another object of the present invention that at least the low quality entertainment system is modularly connected to a dashboard of an automobile and to the speakers in the automobile to facilitate convenient discarding of the low quality entertainment system in the event technical problems are experienced.

Another object of the invention is to provide the ability to switch between various entertainment or communication systems in the automobile, particularly in view of the growing number of automobile accessories.

Another object of the invention is to utilize the broadcast system in the automobile for several of the different entertainment and communication systems in the automobile to maximize the quality of the communication received from external sources in the automobile.

Another object of the invention is to utilize the broadcast system in the automobile for several of the different entertainment and communication systems in the automobile including the ability to receive audio and video signals on-demand from a video provider, and to selectively transmit the received communication to various broadcast and viewing devices in the automobile.

To achieve these and other objects, the present invention provides an entertainment system for a vehicle having front and rear speakers. The entertainment system includes a high quality entertainment system for playing a high quality medium to first passengers of the vehicle desiring high quality entertainment by outputting a high quality signal, and a low quality entertainment system for playing a low quality medium to second passengers of the vehicle by outputting a low quality signal, the second passengers having no preference between the high quality entertainment and low quality entertainment. In addition, the entertainment system includes a controller monitoring the high and low quality signals output from the high and low quality entertainment systems respectively, and outputting a control signal to control switching between the high and low quality entertainment systems and the front and rear speakers responsive to the high and low quality signals. Further, a switch is provided, connected to the low and high quality entertainment systems and the controller, where the switch connects the low and high quality entertainment systems responsive to the control signal received from the controller.

These together with other objects and advantages which will be subsequently apparent, reside in the details of construction and operation as more fully hereinafter described and claimed, with reference being had to the accompanying drawings forming a part hereof, wherein like numerals refer to like elements throughout.

DETAILED DESCRIPTION OF THE PREFERRED EMBODIMENTS

Figure 1:
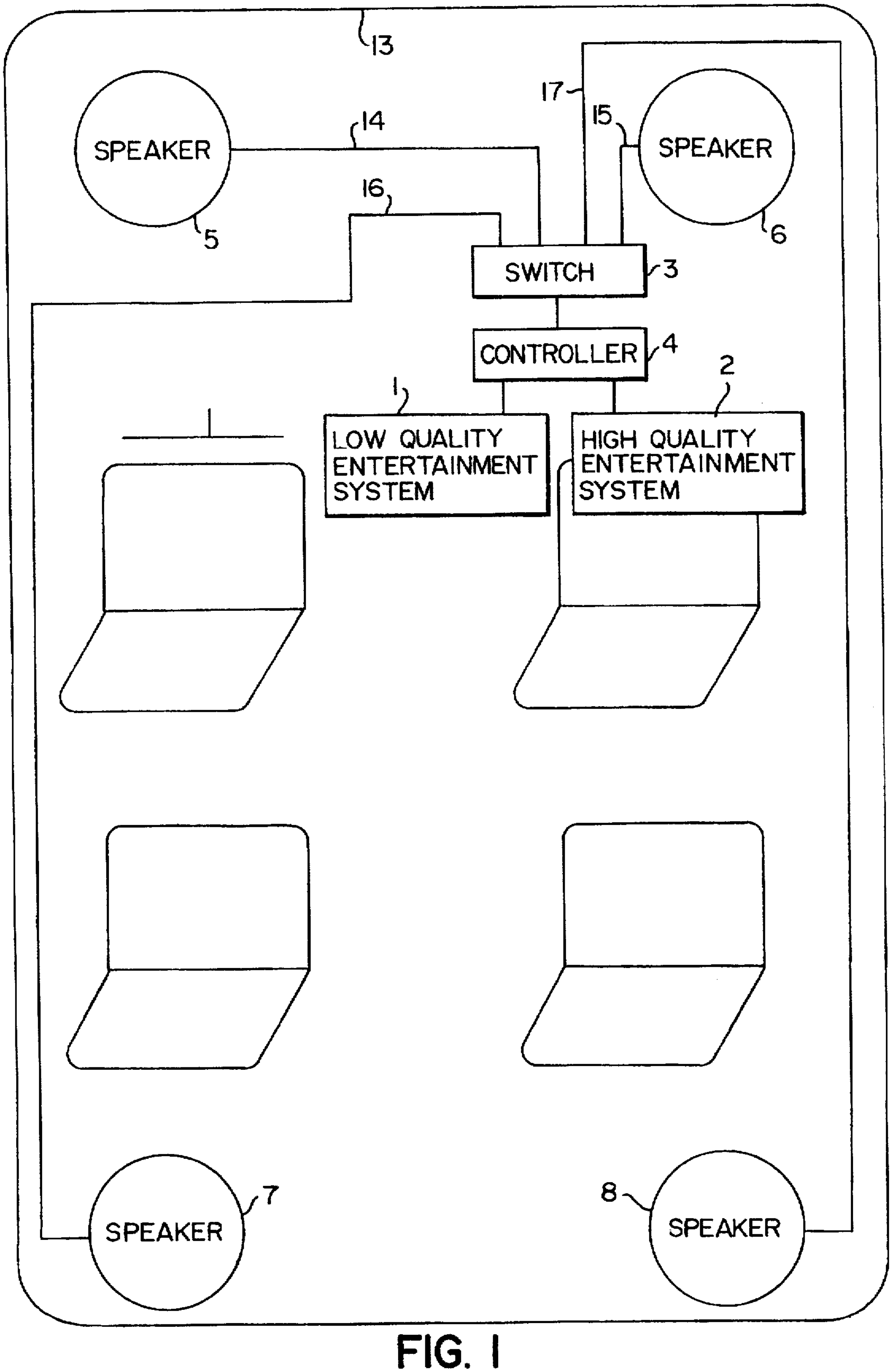
FIG. 1 is a conceptual drawing of the entertainment system of the present invention in an automobile.

FIG. 1 is a conceptual drawing of the entertainment system of the present invention arranged in an automobile. In FIG. 1, four speakers 5–8 are typically provided in automobile 13; for example, two speakers 5–6 for the passengers in the front seat and two speakers 7–8 for the passengers in the rear seat. In the present invention, each of speakers 5–8 are connected to switch 3 via conductors 14–17. Switch 3 is also connected to low and high quality entertainment systems 1 and 2 to connect the appropriate entertainment system to the appropriate speakers as required. As indicated earlier, low and high quality entertainment systems 1 and 2 represent a low quality entertainment system for playing low quality medium, and a high quality entertainment system for playing high quality medium, respectively.

Accordingly, since the passengers listening to the low quality entertainment system have untrained ears, it is unnecessary to risk damage to the high quality entertainment system for playing the low quality medium. Thus, switch 3 connects high quality entertainment system 2 to the appropriate speakers, which may be predetermined to be, for example, all four speakers 5–8 when only high quality entertainment system 2 is active, and the front speakers 5–6 when both low and high quality entertainment systems 1–2 are active. Conventional controller 4 is connected to switch 3 to control the above appropriate switching based upon the received signals from low and high quality entertainment systems 1 and 2. Thus, controller 4 monitors the signals output from low and high quality entertainment systems 1–2 and controls switch 3 in response to the monitored signals in a conventional manner. Controller 4 may be, for example, a microprocessor which has the requires switching instructions, discussed below, in microcode. In addition, Controller 4 may monitor the signals output from the low and high entertainment systems 1–2 for the existence of the signals to determine that active status of each of the low and high quality entertainment systems 1–2, or alternatively, controller 4 may monitor the signal characteristics as well. Since low quality entertainment systems will likely suffer from a greater signal distortion than high quality entertainment systems, controller 4 may, optionally, determine based upon the received signal characteristics, which of the low and high quality entertainment systems 1–2 have output the signal and is active.

A typical switching scheme, although others will be apparent, is as follow: When only one passenger in the automobile is present, the passenger is the driver who will likely desire to experience high quality entertainment system 2. Thus, when only high quality entertainment system 2 is being used, switch 3 is controlled by controller 4 to operate high quality entertainment system 2 using all four speakers 5–8 since high quality music is likely, at times, to be quadraphonic requiring the use of all four speakers 5–8.

Alternatively, controller 4 is designed to control switch 3 so that when only the low quality entertainment system 1 is activated, only rear speakers 7–8 are connected to the low quality entertainment system 1. In this scenario, the assumption is that the intended listener or viewer is one who is not sophisticated, and therefore, likely to listen to low quality medium not being able to appreciate the difference between the high and low quality medium. In fact, it is likely that the unsophisticated listener or viewer will not even have the option for purchasing the desired entertainment medium on high quality medium. For example, children's music is often recorded on low quality cassettes which may damage more sensitive high quality cassette players. In addition, it may be too expensive or unnecessary to purchase the high quality medium for the unsophisticated person with untrained ears since this would simply be a waste of money.

The present invention is also designed to play the appropriate medium to both sophisticated and non-sophisticated listeners or viewers simultaneously. For example, when both the sophisticated and non-sophisticated listeners or viewers wish to listen or view the medium simultaneously, controller 4 controls switch 3 to connect high quality entertainment system 2 to, for example, front speakers 5–6, and to connect low quality entertainment system 1 to speakers 7–8 when both low and high quality entertainment systems 1–2 have been determined to be active by controller 4. This scenario, for example, would allow the driver of children to listen to their own music on high quality entertainment system 2 while the children could listen to their own music which is typically of a poor quality having been played over and over again on low quality entertainment system 1.

Controller 4 is further able to control switch 3 to connect the appropriate speakers to low and high quality entertainment systems 1–2 depending on whether one or both of low and high quality entertainment systems 1–2 are active. Thus, if, for instance, controller 4 detects that only high quality entertainment system 2 is active, and then controller 4 subsequently determines that low quality entertainment system 1 is also to be activated by the user, controller 4 changes the connection of speakers from speakers 5–8, all being connected to high quality entertainment system 2, to speakers 5–6 being connected to high quality entertainment system 2 and speakers 7–8 being connected to low quality entertainment system 1. This above example assumes that the sophisticated listener or viewer is seated in the front seats of the automobile, and the unsophisticated listener or viewer is seated in the rear seats of the automobile. Of course, other scenarios or connections of speakers to the low and high quality entertainment systems 1–2 may be available and are within the scope of the present invention.

It should also be noted that in the alternative to an electronically controlled switch, switch 3 may also be a toggle switch, for example, a three-position toggle switch which performs the switching operations indicated above. According to this scheme, controller 4 is replaced by a person who manually determines which combination of speakers and entertainment systems to experience based upon the setting of the toggle switch.

Figure 2:
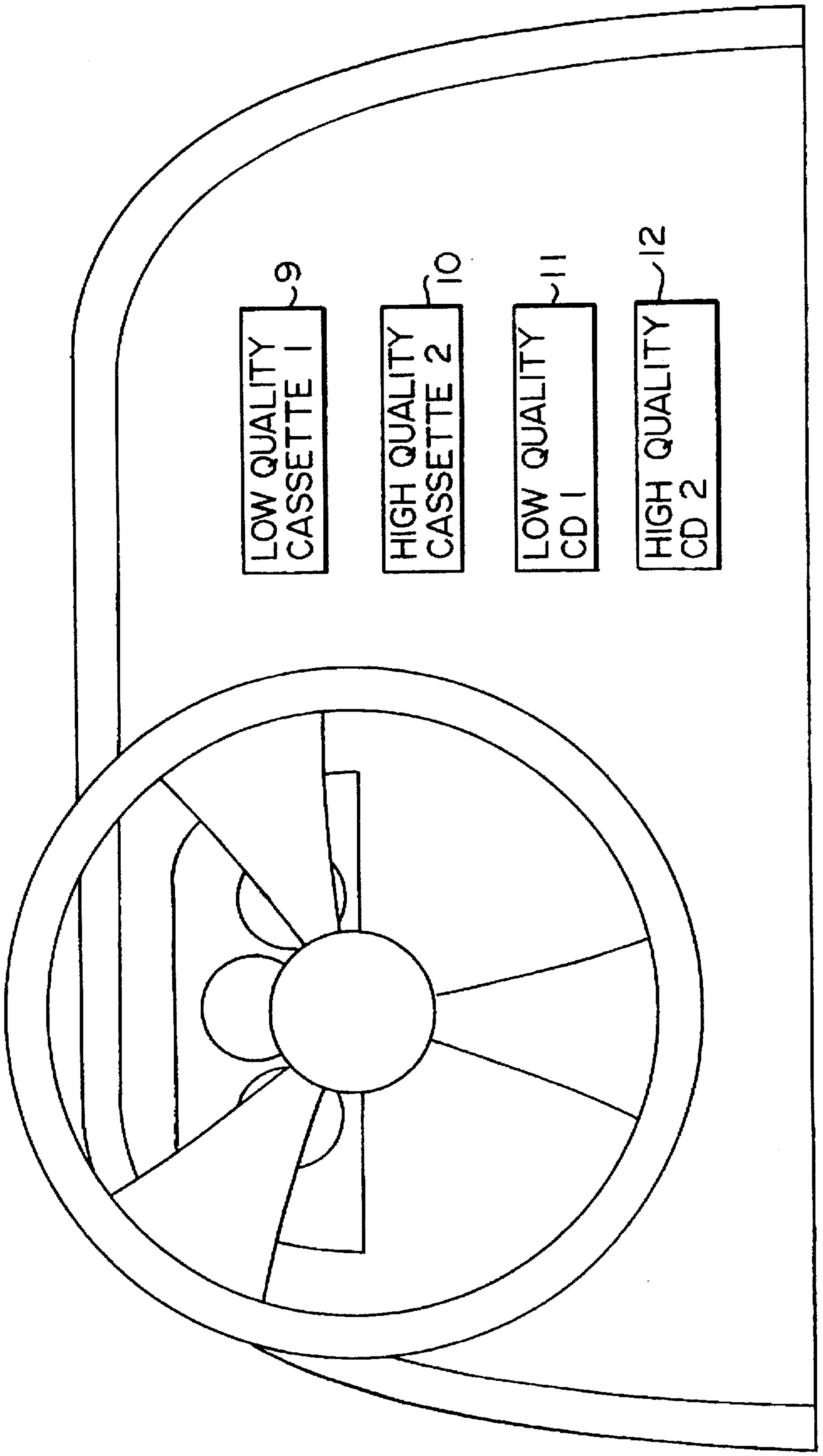
FIG. 2 is a diagram of the present invention as installed in the dashboard of an automobile.

FIG. 2 is a diagram of one example of the present invention as installed in the dashboard of an automobile. As shown in FIG. 2, the dashboard of the automobile includes various entertainment systems installed therein. In this example, four entertainment systems are installed in the dashboard. Specifically, low and high quality cassette players 9 and 10 (designated in the figures as low quality cassette 1 and high quality cassette 2 are installed in the dashboard. In addition, low and high quality compact disc players 11 and 12 (designated in the figures as low quality CD 1 and high quality CD 2 are also installed in the dashboard.

According to the above arrangement, controller 4 controls switch 3 to connect the various entertainment systems 9–12 as previously described where controller 4 is able to determine the whether cassettes 9 and 10 and compact discs 11 and 12 are activated. In addition, controller 4 is preset to identify that cassette 10 and compact disc 12 represent high quality systems and cassette 9 and compact disc 11 may represent low quality entertainment systems. Thus, controller 4 is able to determine which of speakers 5–8 should be connected to the appropriate low and high quality entertainment systems 9–12.

Figure 3:
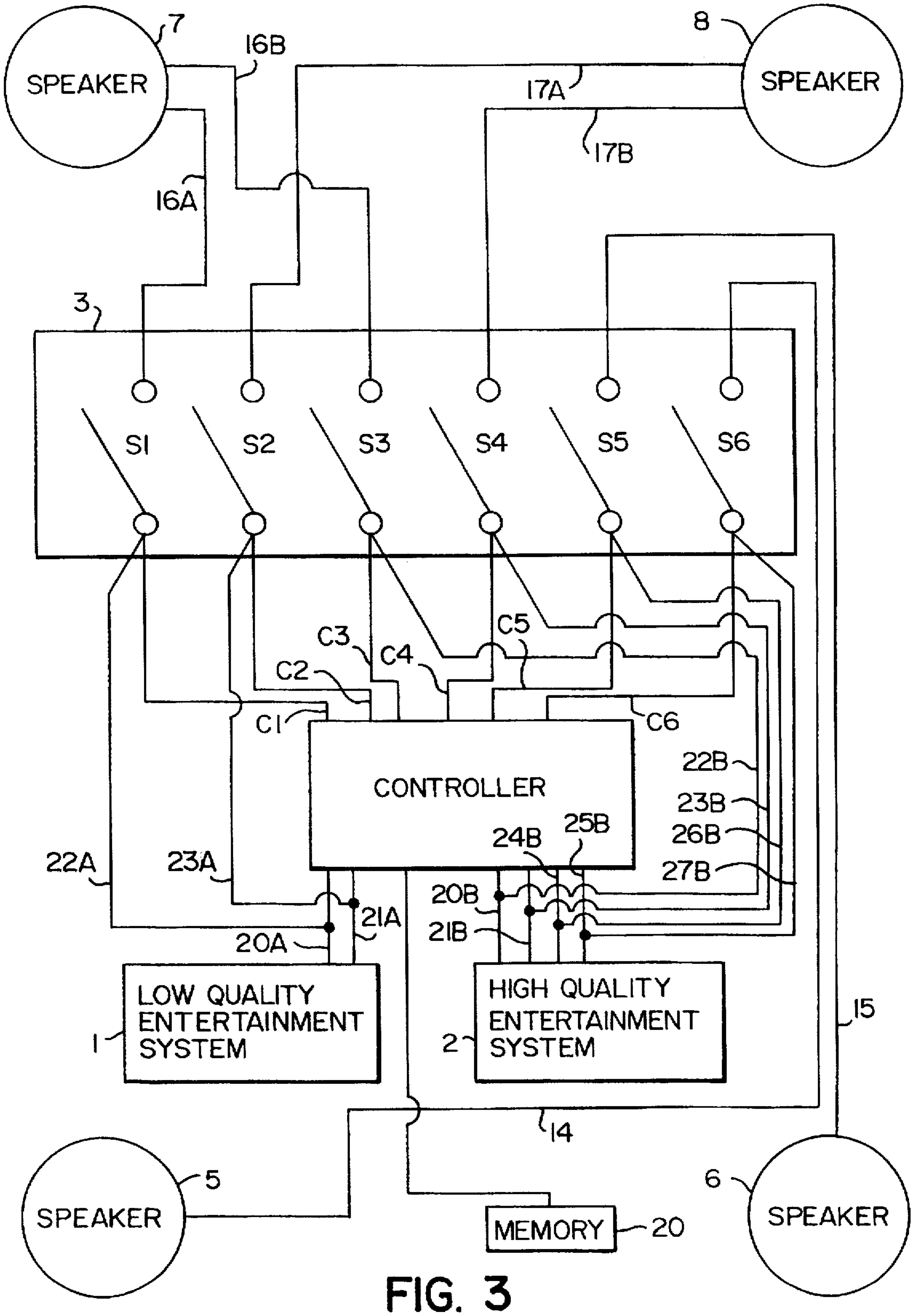
FIG. 3 is a detailed circuit diagram of a first embodiment of the entertainment system of the present invention.

FIG. 3 is a detailed circuit diagram of a first embodiment of the entertainment system of the present invention defining the connections between switch 3, controller 4 and speakers 5–8. In FIG. 3, switch 3 includes six separate switches S1–S6 which are controlled by controller 4. Speakers 5 and 6 are connected to switches S5 and S6 via conductors 14 and 15 for broadcasting sound to the front of the automobile played by high quality entertainment system. In addition, speaker 7 is connected to switches S1 and S3 via conductors 16A and 16B, and speaker 8 is connected to switches S2 and S4 via conductors 17A and 17B.

In addition, controller 4 monitors the signals output from low and high quality entertainment systems 1–2. As shown in FIG. 3, controller 3 monitors signals output from low quality entertainment system 1 via conductors 20A and 21A and monitors signals output from high quality entertainment system 2 via conductors 20B, 21B, 24B and 25B.

Further, the low and high quality entertainment systems 1–2 are connected to switches S1–S6 for switching to the appropriate speakers 5–8. Specifically, low quality entertainment system 1 is connected to switches S1 and S2 via conductors 22A and 23A, and high quality entertainment system 2 is connected to switches S3–S6 via conductors 22B, 23B, 26B and 27B. Finally, controller 4 is connected to switches S1–S6 via conductors C1–C6 for controlling the appropriate open/close configuration according to the monitored signals output from low and high quality entertainment systems 1–2. Controller 4 may, for example, consult a table stored in a conventional memory which indicates the appropriate switch settings for switches S1–S6 based upon the combination of signals monitored from low and high quality entertainment systems 1–2.

Figure 4:
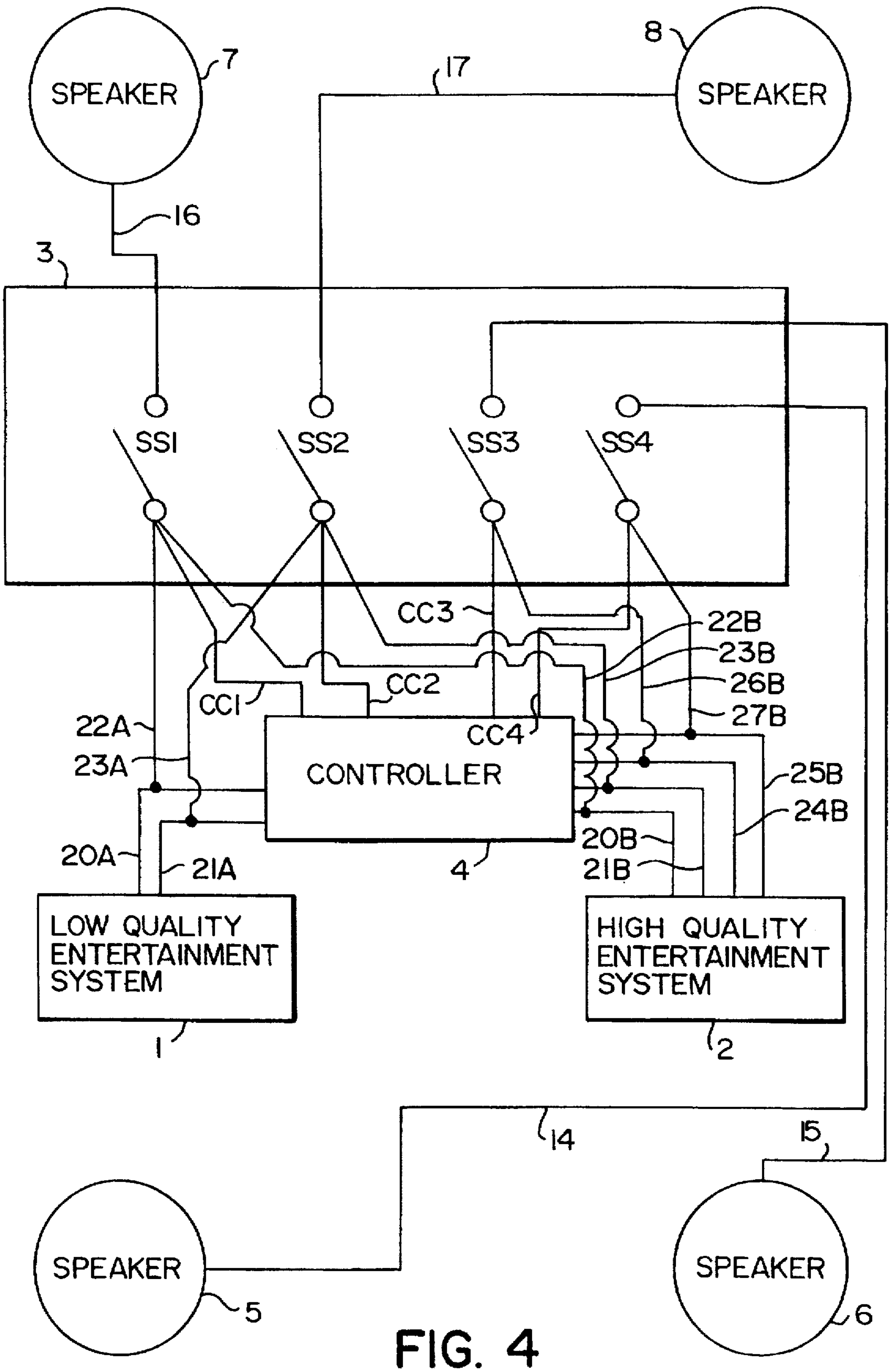
FIG. 4 is a detailed circuit diagram of a second embodiment of the entertainment system of the present invention.

FIG. 4 is a detailed circuit diagram of a second embodiment of the entertainment system of the present invention. In FIG. 4, instead of six separate switches S1–S6 as illustrated in FIG. 3, the second embodiment of the invention includes four switches SS1–SS4. As shown in FIG. 4, speakers 5–8 are connected to switches SS1–SS4 via conductors 14–17. In addition, controller 4 is also connected to switches SS1–SS4 via conductors CC1–CC4 for controlling the opening and closing of the switches responsive to the signals monitored from low and high quality entertainment systems 1–2. Accordingly, controller 4 is connected to low and high quality entertainment systems 1–2 via conductors 20A, 21A, 20B, 21B, 24B and 25B for monitoring the signals output from low and high quality entertainment systems 1–2. Further, low and high quality entertainment systems 1–2 are connected to switches SS1–SS4 via conductors 22A, 23A, 22B, 23B, 26B and 27B. As illustrated, since only four switches SS1–SS4 are used, low and high quality entertainment systems 1–2 share switches SS1 and SS2. The benefit in this embodiment that fewer switches are needed, i.e. only four switches SS1–SS4, and fewer conductors are also needed, i.e., only four conductors 14–17. Thus, the second embodiment minimizes the hardware needed to accomplish the specific results of the present invention.

Figure 5:
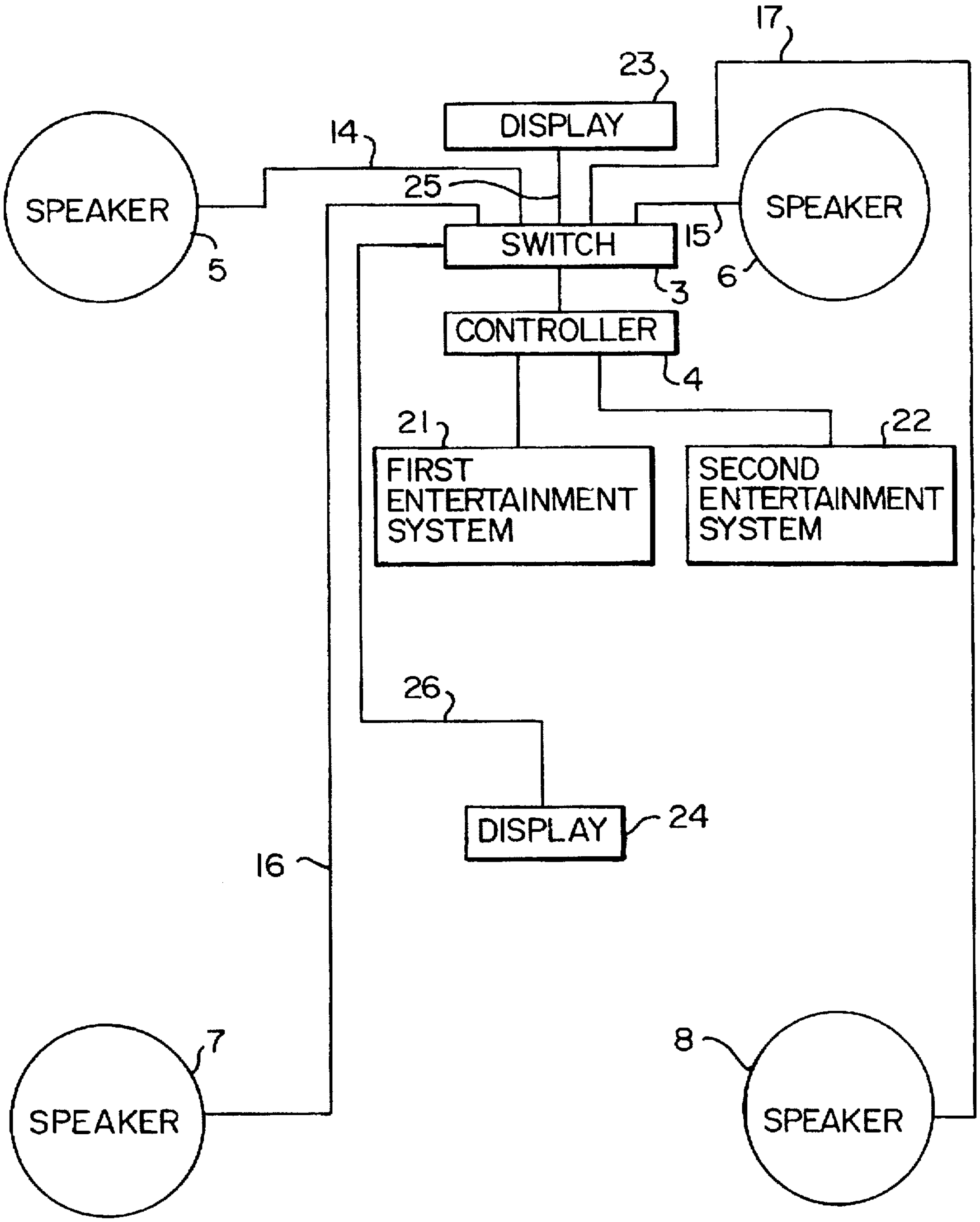
FIG. 5 is a conceptual drawing of the present invention also employing displays for viewing the entertainment.

FIG. 5 is a conceptual drawing of the present invention which may also employ displays for viewing the entertainment. In FIG. 5, four speakers 5–8 are typically provided in a vehicle; for example, two speakers 5–6 for the passengers sitting in seats located in a first position of the vehicle, and two speakers 7–8 for passengers sitting in seats located in a second position of the vehicle. In the present invention, each of speakers 5–8 are connected to switch 3 via conductors 14–17. Switch 3 is also connected to first and second entertainment systems 21 and 22 to connect the appropriate entertainment system to the appropriate speakers as required. Further, displays 23 and 24 are also provided and connected to switch 3 via conductors 25 and 26 to permit entertainment broadcast from first and second entertainment systems 21 and 22 to be viewed by passengers sitting in seats located in the first and second locations of the vehicle.

Figure 6:
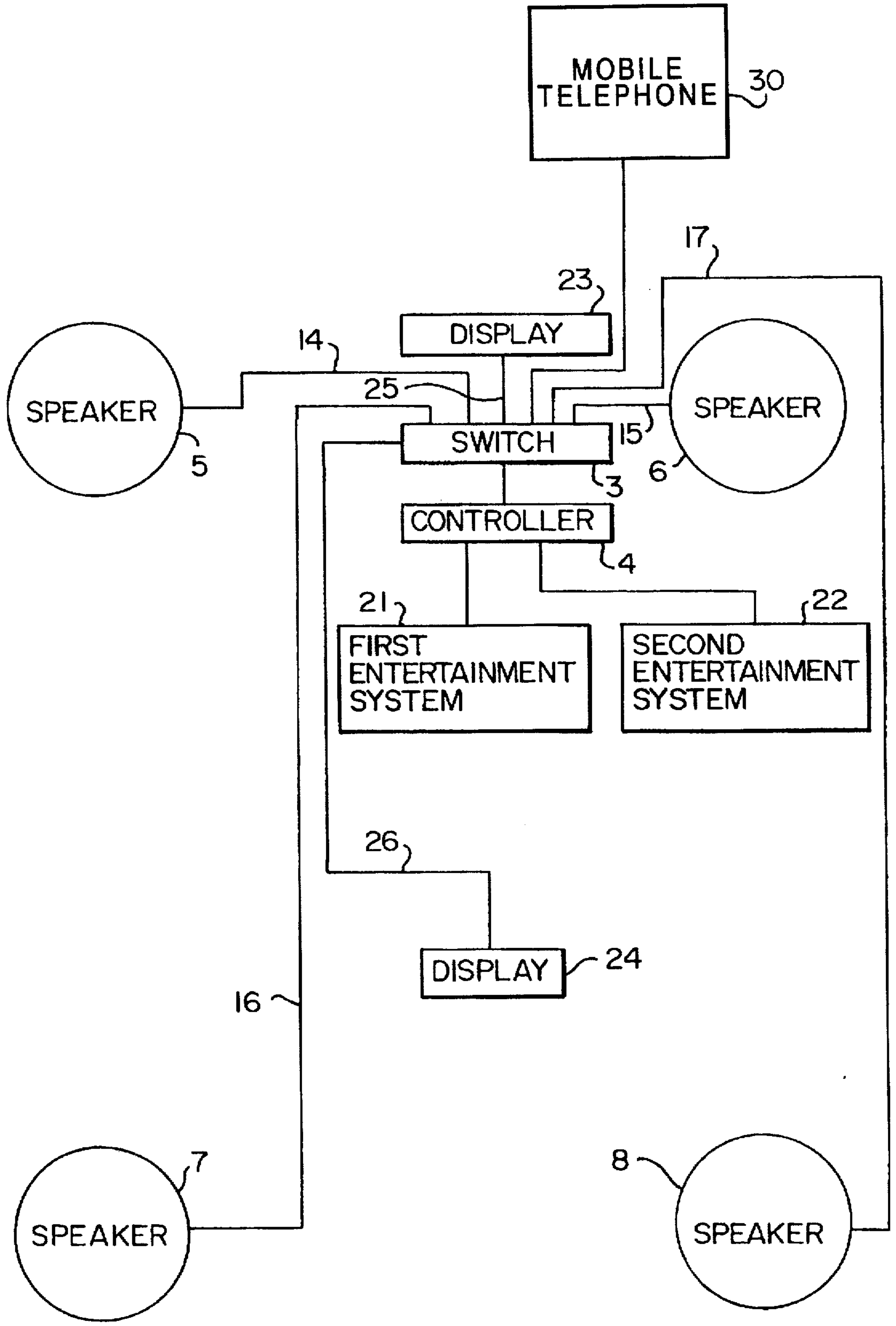
FIG. 6 is a conceptual drawing of the present invention also employing displays for viewing the entertainment and a mobile telephone.

FIG. 6 is a conceptual drawing of the present invention also employing displays for viewing the entertainment and a mobile telephone. As shown in FIG. 6, the communication signals received from mobile telephone 30 may be selectively switched between the various broadcast devices and display located in the automobile as previously described above in detail.

Figure 7:
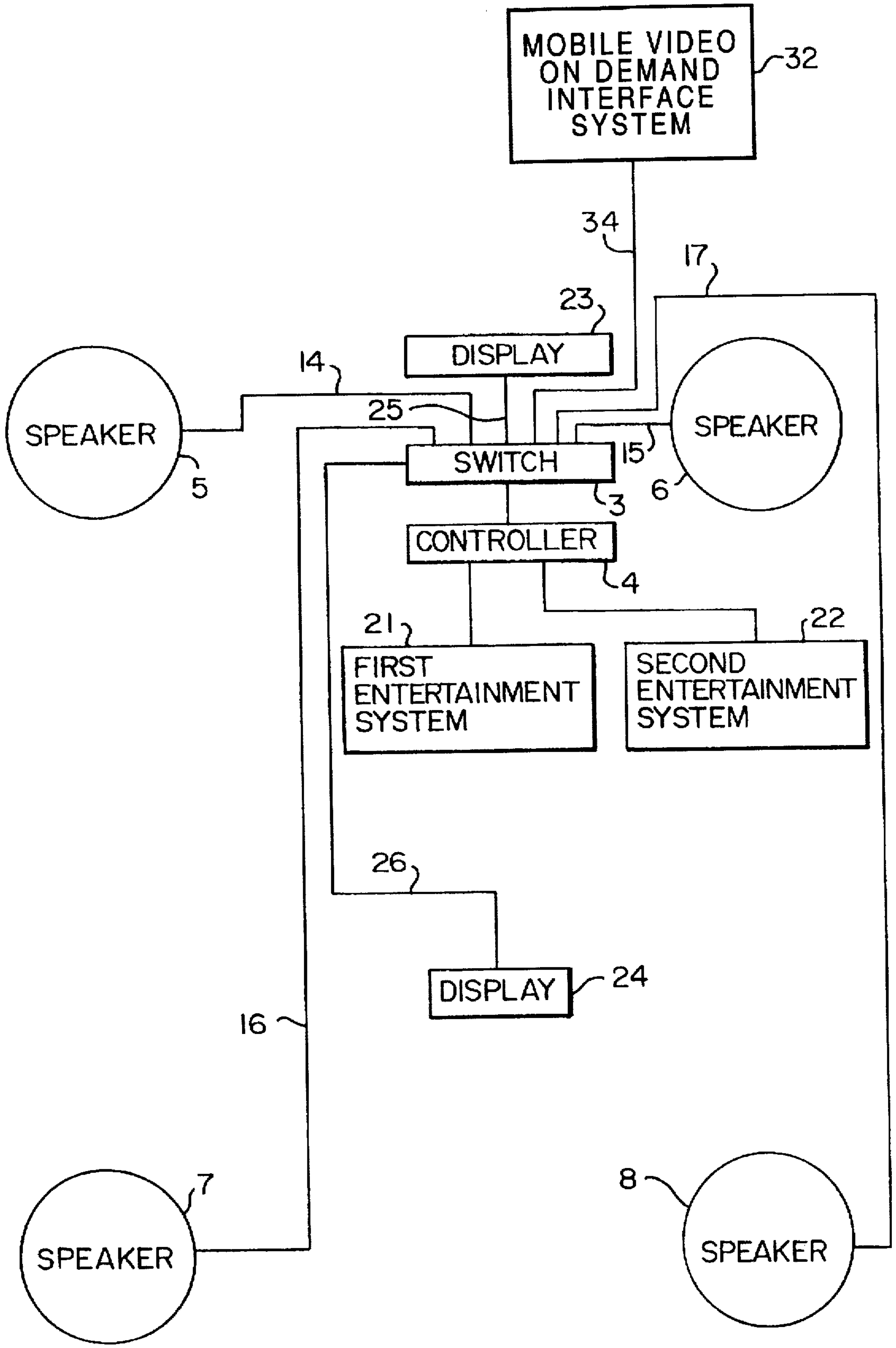
FIG. 7 is a conceptual drawing of the present invention also employing displays for viewing the entertainment and a mobile video on-demand interface system.

FIG. 7 is a conceptual drawing of the present invention also employing displays for viewing the entertainment and a mobile video on-demand interface system. As shown in FIG. 7, the communication signals received from mobile video on-demand system 32 may be selectively switched between the various broadcast devices and display located in the automobile as previously described above in detail.

Figure 8:
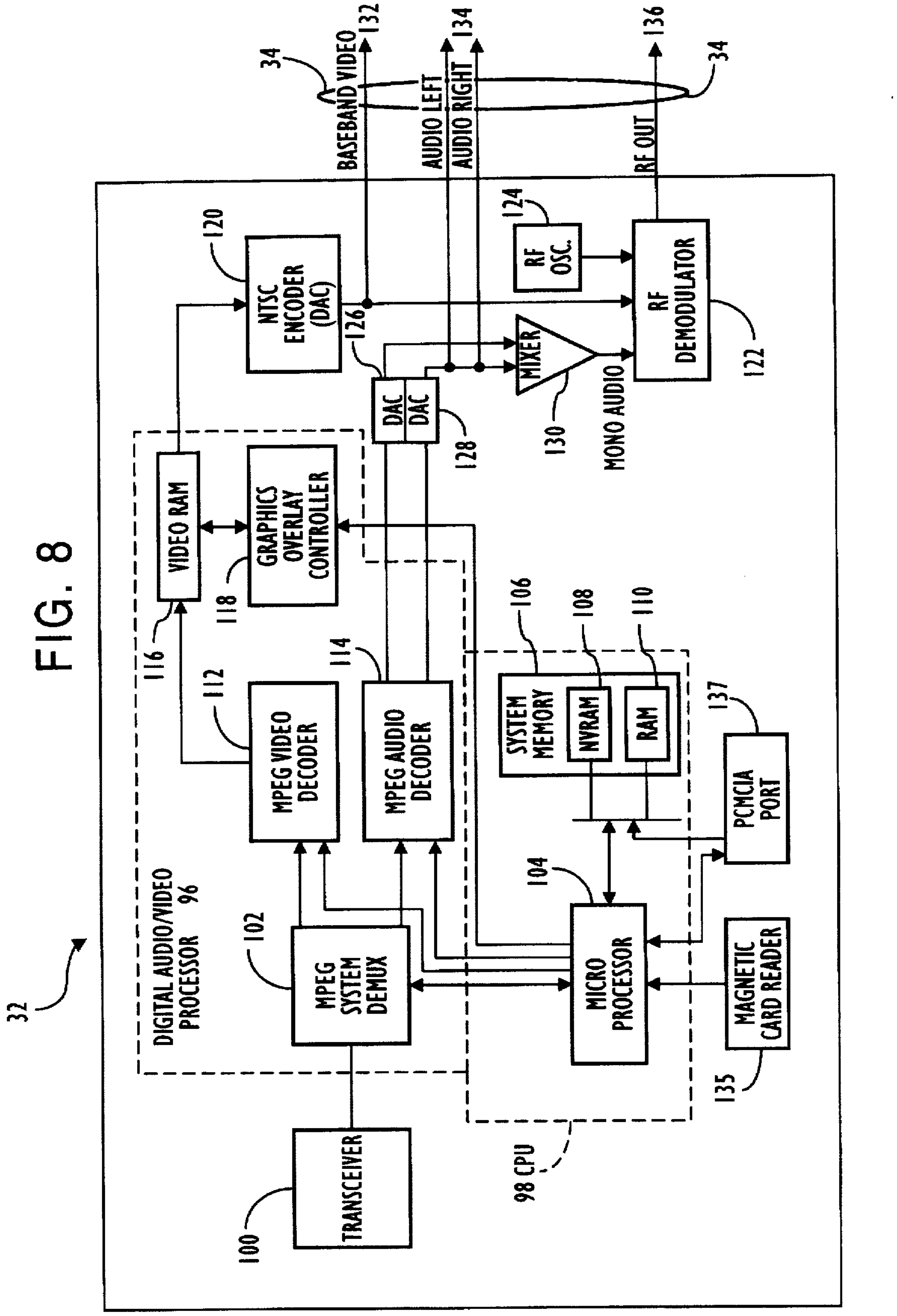
FIG. 8 is a detailed block diagram of the mobile video on-demand interface system of FIG. 7.

FIG. 8 is a detailed block diagram of the mobile video on-demand interface system of FIG. 7. As illustrated in FIG. 8, mobile video interface system 32 may connect or interface with a number of different types of application provider networks. For each different type of network, mobile video interface system 32 includes transceiver 100 providing the actual physical connection to the particular type of network. Transceiver 100 will also perform any format conversion necessary between signal formats utilized by the network and signal formats used within mobile video interface system 32. Transceiver 100 also provides two-way signal conversion and formatting, for example, for a control signalling channel and other standard cellular protocol described previously.

In the illustrated embodiment, transceiver 100 presents two connections to the rest of mobile video interface system 32, a high bit rate broadband connection and a low bit rate signaling connection. The broadband connection is a one-way downstream only connection, but the low-bit rate signaling connection is a two-way connection.

Transceiver 100 may take the form of a plug in module. In the preferred embodiment, transceiver 100 would be similar to a daughter board or option card which can be plugged into a back plane of a personal computer (PC). In such an embodiment, typically a technician could replace the module in either the field or the shop, to modify transceiver 100 to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the transceiver 100, and input/output connections compatible with all of the digital broadband networks currently available. The downloaded operating system software stored in the system memory of the transceiver would control operations of the digital signal processor to send and receive signals in accord with the particular network the subscriber chooses to connect with transceiver 100.

Mobile video interface system 32 includes CPU 98, comprising, for example, a 386 or 486 microprocessor 104 and associated system memory 106. The system memory 106 preferably includes at least 2 Mbytes of volatile dynamic RAM 110 and 1 Mbyte of non-volatile RAM 108. The microprocessor 104 also includes a small amount of ROM (not shown) storing "loader" programming needed to control "wake-up" after the power is turned "on". An EPROM memory (not shown) also may be added.

A digital audio/video signal processor 96, controlled by the CPU 98, produces digital uncompressed audio and video or graphical signals from the audio and video MPEG encoded packets received from the network through transceiver 100. The audio/video processor 96 includes a standard MPEG system demultiplexer 102, a standard MPEG video decoder 112, an MPEG audio decoder 114, a graphics overlay controller 118 and at least two frames (e.g. 8 Mbytes) of video RAM 116. See, for example, MPEP Digital Video Compression Standard by Mitchell (ISBN 0-442-01920-3), incorporated herein by reference.

The MPEG system demultiplexer circuitry 102 recognizes packets in the MPEG data stream received over the broadband channel through transceiver 100, and routes the packets to the appropriate components of mobile video interface system 32. For example, the MPEG system demultiplexer 102 circuitry recognizes audio and video packets in the MPEG data stream and routes those packets to the decoders 114 and 112, respectively.

The MPEG video decoder 112 decompresses received video or graphical packet signals to produce a digital signal, and the MPEG audio decoder 114 decompresses received audio packets to produce left and right digitized stereo signals. For at least some functions, the MPEG decoders 112, 114 may be controlled in response to signals from the microprocessor 104. The MPEG video decoder 112 will internally include at least two frames (e.g. 8 Mbytes) of RAM (not separately shown) for use as a frame reorder buffer during the MPEG decoding process, and the MPEG audio decoder 114 also may include some buffer memory.

The video RAM 135 is preferably a standard digital data RAM, of appropriate size, which is used in mobile video interface system 32 to store digitized frames of video data. The RAM within the MPEG video decoder 112 likewise consists of standard digital data RAM.

The graphics overlay controller 118 produces displays of text and graphics data, such as the initial turn-on selection menu received over the signaling channel, in response to instructions from the CPU 98. The video RAM 116 sequentially receives each frame of digitized, uncompressed video information, as output from the MPEG video decoder 112. The video RAM 116 also receives digital information and read/write control signals from the graphics overlay controller 118 representing the several planes of text and graphics information and combines that information with the frames of decompressed video to produce composite video frames.

The graphics overlay controller 118 and the video RAM 116 cooperate to manipulate, for example, five different planes of video information, four of which may be active at any one time, to produce the composite video frame output signals. The individual planes comprise the decoded MPEG video frames, a cursor, two graphics/text image planes manipulated by the microprocessor 104 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 112. When no received video frames are to be output, either when none are received or when they are to be entirely replaced, the information from the graphics overlay controller 118 specifies a background and the active planes of text or graphic information. When received video frames are combined with text and/or graphics, the composite video frames include the uncompressed received video frames with selected pixels thereof replaced with graphics or textual data display pixels specified by the graphics overlay controller 118. In this last situation, the graphics overlay controller 118 would deactivate the backdrop plane.

Mobile video interface system 32 also includes audio and video digital to analog converters and appropriate drivers to produce output signals compatible with a conventional television set or monitor. Specifically, the converter and driver circuitry of mobile video interface system 32 includes audio digital to analog converters (DAC) 126, 128, an audio mixer 130, an NTSC encoder 120, and an RF (radio frequency) demodulator 122.

The DAC's 126 and 128 receive the uncompressed left and right digitized audio signals output by the MPEG audio decoder 114. In response, the DAC's 126 and 128 produce baseband analog audio signals for output to individual baseband output terminals. The audio mixer 130 also receives the baseband audio signals from the DAC's 126 and 128. The mixer 130 combines the left and right analog audio signals to produce a monaural audio signal as the audio input to demodulator 122 which is synchronized via RF oscillator 124.

The NTSC encoder 120 also performs a digital to analog converter (DAC) function. In response to the digitized video signals received from the video RAM 116, the NTSC encoder 120 produces a baseband analog signal in standard NTSC format. The baseband NTSC signal is supplied to an output terminal 132 of mobile video interface system 32. The baseband NTSC video signal is also supplied to the RF demodulator 122. The RF demodulator 122 responds to the mono audio signal, the NTSC signal and an RF signal from a local RF oscillator 124, to produce a standard RF television signal on an available TV channel, typically channel 3 or channel 4.

The type of connection of mobile video interface system 32 to the television set or monitor depends on the capabilities of the user's television set. If the user has a monitor type television capable of receiving baseband video and stereo audio inputs, the appropriate terminals of the television would connect directly to the video and audio output terminals 132 and 134 of mobile video interface system 32. If the subscriber does not have such a television monitor, then the RF output of the demodulator 122 would be connected to the cable or antenna input connection of the television, e.g. by coaxial cable via RF output 136. Alternatively, the digitized video and audio may go to separate output terminals (not shown) for connection to inputs of digital display devices, for example, for high definition television (HDTV) sets.

Mobile video interface system 32 is an open interface device in that it interacts with equipment of a large number of program providers to offer users a wide array of principally audio programming for the mobile user. Mobile video interface system 32 is preferably a programmable device to which different individual program providers can download application software, and at least one program provider can download all or a part of the operating system. In non-volatile memory (ROM and non-volatile RAM), mobile video interface system 32 will store a loader program and an operating system. The loader program and operating system in the ROM and the non-volatile RAM will include sufficient programming to control initial communications and define interfaces and drivers.

Mobile video interface system 32 also includes a magnetic card reader 135 connected to the microprocessor 104. This reader 135 could be used to scan credit card information encoded on magnetic strips on commonly available credit cards for purchasing audio programming. In a home shopping and purchasing audio service, controlled by the downloaded software, the user would scan their own credit card through the magnetic card reader 135 as part of the payment operations. The reader could also have magnetic write capabilities to perform debit card operations.

Mobile video interface system 32 further includes a personal computer memory-card interface adapter (PCMCIA) port 137. This is a two-way interface for connection to and communication with a flash memory module, such as is now incorporated into advanced "smart card" devices. A user might communicate with an auxiliary database connected via PCMCIA port 137 and a broadband network. For example, the user's personal information could be read from the smart card and subsequently updated on the smart card, through the PCMCIA port 137. Another use of this port might involve communication to another system to download information. Although specified as a "memory" port and mapped by the CPU as part of its system memory space, the devices connected to this port 137 can have other data processing capabilities, e.g. buffering and modem communication capability.

In the current implementation, the PCMCIA port 137 will carry 6 Mbits/s of data, but the port can be designed for higher speeds such as 20 Mbytes/s. Another use of this port would be for connection to an Ethernet card or other Local Area Network (LAN) card to permit data communications between mobile video interface system 32 and one or more computers. Mobile video interface system 32 would provide the computers with communication services through the broadband network, for example to receive high speed downloads of new or updated software for those computers.

Figure 9:
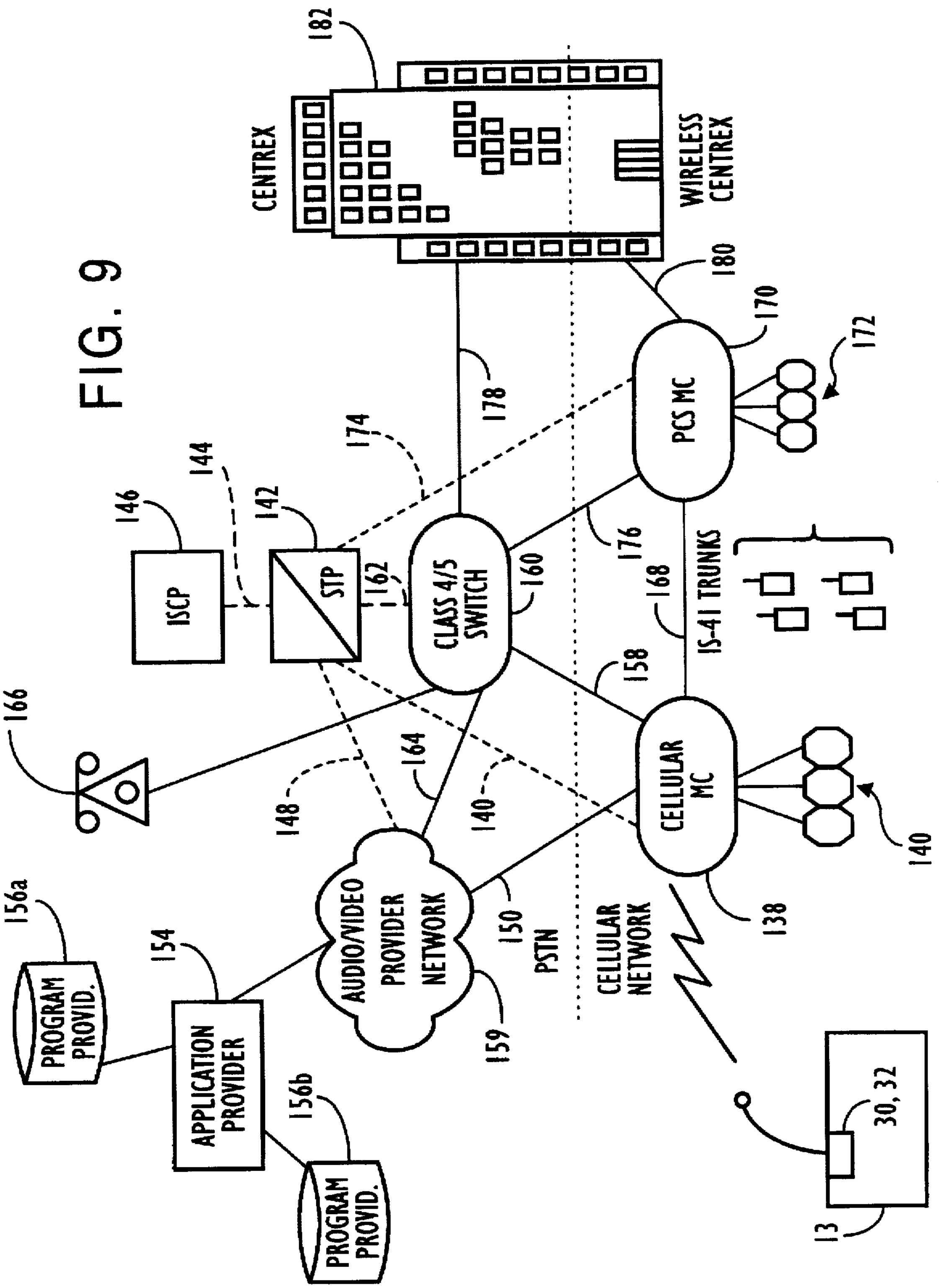
FIG. 9 is a detailed block diagram of the present invention also employing displays for viewing the entertainment and a mobile telephone in an advanced intelligent network (AIN) system.

FIG. 9 is a detailed block diagram of the present invention also employing displays for viewing the entertainment and a mobile telephone in an advanced intelligent network (AIN) system. In FIG. 9, one or more central office switches, such as the class 4/5 Switch 160, are located throughout a state or region served by a telephone operating company (TELCO). Local telephone lines connect the central office switch 160 to individual telephone terminals in each geographic area, for example to the Plain Old Telephone Service (POTS) phone 166.

Although shown as telephones in FIG. 9, the terminals can comprise any communication device compatible with the line. In addition, wireless communication services are provided via radio links using frequencies assigned to cellular communications networks. Other types of wireless communication, however, could be substituted for the radio communication systems. For example, the invention could use a series of radio relay transponders, an infrared system or a satellite based system to provide one or more of the wireless links.

Switch 160 connects via trunk circuits 158, 176 to one or more Mobility Controllers (MC's), such as the Cellular MC 138 and the Personal Communication Service (PCS) MC 170. Each central office my also connect via trunk circuits to one or more remote central offices. The trunk circuits carry large numbers of telephone calls between central offices and/or between a central office and the mobility controllers. Also, each central office has a Common Channel Inter-office Signalling (CCIS) type data link 125 going to a Signalling Transfer Point (STP) 142. CCIS type data links 140 and 174 provide data communication for PCS and related special service processing between the MC's 138, 170 and the STP 142. Also, a CCIS packet switched data link 144 connects the STP 142 to an Integrated Serves Control Point (ISCP) 146.

Each MC connects to antennas for a number of cell cites to provide wireless communication services to PCS portable handsets and/or other wireless mobile communication devices including mobile video interface system 32 discussed in detail below. In the example shown, Cellular MC 138 controls communications via a number of macrocells 140. PCS MC 170 controls communications via a number of microcells 172. The MC's 138, 170 are also interconnected with each other by IS-41 data trunks 168, and may be interconnected via voice trunks (not separately shown) essentially running in parallel with the IS-41 trunks 168.

Mobile video interface system 32 interfaces with cellular mobility controllers 138 and 170 for ordering and receiving audio programming from an application provider. See, for example, Design Issues for Interactive Television Systems, Furht et al., IEEE Computer p.25 (May 1995). Cellular mobility controllers 138 is connected to audio/video provider network 152 via IS-41 data trunk line 150. In addition, cellular mobility controller 170 is connected to audio/video provider network 152 via IS-41 data trunk 176, switch 160 and IS-41 data trunk line 164. Alternatively, mobility controller 170 may be directly connected to audio/video provider network 152. Audio/video provider network 152 may also be connected to STP 142 via CCIS type data link 148 to permit some limited control exercised by ISCP 146. Audio/video provider network 152 retrieves the audio selection from the appropriate application provider 154 and program provider 156a, 156b.

Additionally, to provide land line type centrex services for a business customer, the switch 160 provides a land line connection 178 to the customer's premises 182. The land line link would actually include a number of telephone lines connected to various types of conventional telephone terminal devices. To provide wireless centrex services to a particular location, which may be the same customer premises 182, lines 180 connect the PCS MC 170 to macrocell antennae within the customer's building. Although shown as a single building, the integrated Centrex could cover a broader area, for example an entire college campus.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An entertainment system for a vehicle having first and second broadcast devices, comprising:
   - an entertainment system for playing a first medium for first entertainment by outputting a first signal;
   - a mobile telephone receiving and playing a second medium by outputting a second signal;
   - controller means for monitoring the first and second signals output from said entertainment system and said mobile telephone respectively, and for outputting a control signal to control switching between said entertainment system and said mobile telephone and the first and second broadcast devices responsive to the first and second signals;
   - a switch, connected to said entertainment system to said mobile telephone and to said controller means, said switch connecting said entertainment system and said mobile telephone responsive to the control signal received from said controller means,
   - wherein when said controller means detects the first and second signals output from said entertainment system and said mobile telephone, said controller means controls said switch to connect said entertainment system to a first at least one of the first and second broadcast devices in the vehicle, and said switch connects said mobile telephone to a second at least one of the first and second broadcast devices in the vehicle for broadcasting the first and second media.

2. An entertainment system for a vehicle having first and second broadcast devices according to claim 1, wherein the first at least one of the first and second broadcast devices in the vehicle includes front speakers in the vehicle, and the second at least one of the first and second broadcast devices includes rear speakers in the vehicle.

3. An entertainment system for a vehicle having first and second broadcast devices according to claim 1, wherein the first at least one of the first and second broadcast devices in the vehicle includes rear speakers in the vehicle, and the second at least one of the first and second broadcast devices includes front speakers in the vehicle.

4. An entertainment system for a vehicle having first and second broadcast devices according to claim 1, wherein the first at least one of the first and second broadcast devices in the vehicle includes rear speakers in the vehicle, and the second at least one of the first and second broadcast devices includes front speakers and the rear speakers in the vehicle.

5. An entertainment system for a vehicle having first and second broadcast devices according to claim 1, wherein the first at least one of the first and second broadcast devices in the vehicle includes front speakers in the vehicle, and the second at least one of the first and second broadcast devices includes the front speakers and rear speakers in the vehicle.

6. An entertainment system for a vehicle having first and second broadcast devices according to claim 1, wherein the first at least one of the first and second broadcast devices in the vehicle includes first speakers in the vehicle, and the second at least one of the first and second broadcast devices includes second speakers in the vehicle.

7. An entertainment system for a vehicle having first and second broadcast devices according to claim 6, wherein the first at least one of the first and second broadcast devices in the vehicle includes first speakers in the vehicle, and the second at least one of the first and second broadcast devices includes second speakers in the vehicle.

8. An entertainment system for a vehicle having first and second broadcast devices according to claim 1, wherein the first at least one of the first and second broadcast devices in the vehicle includes at least one of front, side, and rear speakers in the vehicle, and the second at least one of the first and second broadcast devices includes the at least one of the front, side, and rear speakers in the vehicle.

9. A system for a vehicle having first and second broadcast devices, comprising:

an entertainment system for playing a first medium for first entertainment by outputting a first signal;

a mobile telephone receiving and playing a second medium by outputting a second signal;

a controller, responsively connected to said mobile telephone and said entertainment system, monitoring the first and second signals output from said entertainment system and said mobile telephone respectively, and outputting a control signal to control switching between said entertainment system and said mobile telephone and the first and second broadcast devices responsive to the first and second signals;

a switch, connected to said entertainment system to said mobile telephone and to said controller, said switch connecting said entertainment system and said mobile telephone responsive to the control signal received from said controller, wherein when said controller detects the first and second signals output from said entertainment system and said mobile telephone, said controller controls connections between said entertainment system and said mobile telephone to a first at least one of the first and second broadcast devices in the vehicle, for selective broadcasting of at least one of the first and second media.

10. A system for a vehicle having first and second broadcast devices according to claim 9, wherein the first at least one of the first and second broadcast devices in the vehicle includes front speakers in the vehicle, and the second at least one of the first and second broadcast devices includes rear speakers in the vehicle.

11. A system for a vehicle having first and second broadcast devices according to claim 9, wherein the first at least one of the first and second broadcast devices in the vehicle includes rear speakers in the vehicle, and the second at least one of the first and second broadcast devices includes front speakers in the vehicle.

12. A system for a vehicle having first and second broadcast devices according to claim 9, wherein the first at least one of the first and second broadcast devices in the vehicle includes rear speakers in the vehicle, and the second at least one of the first and second broadcast devices includes front speakers and the rear speakers in the vehicle.

13. A system for a vehicle having first and second broadcast devices according to claim 9, wherein the first at least one of the first and second broadcast devices in the vehicle includes front speakers in the vehicle, and the second at least one of the first and second broadcast devices includes the front speakers and rear speakers in the vehicle.

14. A system for a vehicle having first and second broadcast devices according to claim 9, wherein the first at least one of the first and second broadcast devices in the vehicle includes first speakers in the vehicle, and the second at least one of the first and second broadcast devices includes second speakers in the vehicle.

15. A system for a vehicle having first and second broadcast devices according to claim 14, wherein the first at least one of the first and second broadcast devices in the vehicle includes first speakers in the vehicle, and the second at least one of the first and second broadcast devices includes second speakers in the vehicle.

16. A system for a vehicle having first and second broadcast devices according to claim 9, wherein the first at least one of the first and second broadcast devices in the vehicle includes at least one of front, side, and rear speakers in the vehicle, and the second at least one of the first and second broadcast devices includes the at least one of the front, side, and rear speakers in the vehicle.

17. A method for a vehicle having first and second broadcast devices, an entertainment system playing a first medium for first entertainment by outputting a first signal, a mobile telephone receiving and playing a second medium by outputting a second signal, and a switch connected to said entertainment system to said mobile telephone and to said controller, comprising:

(a) monitoring the first and second signals output from said entertainment system and said mobile telephone respectively, and outputting a control signal to control switching between said entertainment system and said mobile telephone and the first and second broadcast devices responsive to the first and second signals;

(b) connecting said entertainment system and said mobile telephone responsive to the control signal received from said controller, (c) detecting the first and second signals output from said entertainment system and said mobile telephone;

(d) controlling connections between said entertainment system and said mobile telephone to at least one of the first and second broadcast devices in the vehicle when the first and second signals are detected, for selective broadcasting of at least one of the first and second media.

18. A method for a vehicle having first and second broadcast devices according to claim 17, wherein the first at least one of the first and second broadcast devices in the vehicle includes front speakers in the vehicle, and the second at least one of the first and second broadcast devices includes the front speakers and rear speakers in the vehicle.

19. A system for a vehicle having first and second broadcast devices according to claim 17, wherein the first at least one of the first and second broadcast devices in the vehicle includes first speakers in the vehicle, and the second at least one of the first and second broadcast devices includes second speakers in the vehicle.

20. A system for a vehicle having first and second broadcast devices according to claim 19, wherein the first at least one of the first and second broadcast devices in the vehicle includes first speakers in the vehicle, and the second at least one of the first and second broadcast devices includes second speakers in the vehicle.

* * * * *